2 Sheets—Sheet 1
W. A. VAN BRUNT.
SEEDER AND CULTIVATOR.
No. 7,466. Reissued Jan. 16, 1877.
Fig. 1
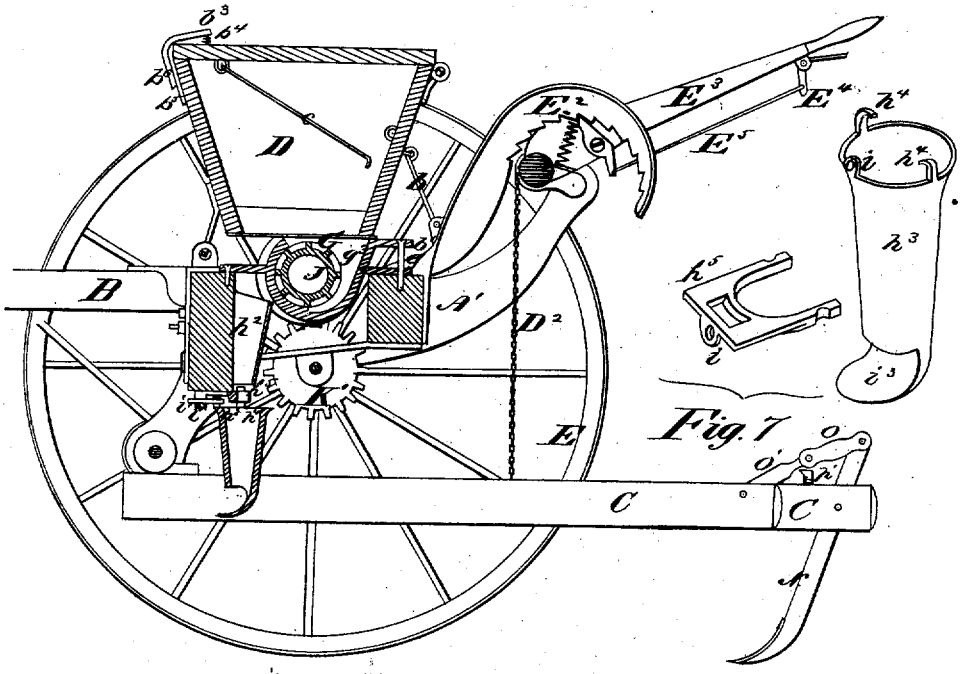
Fig. 7
Fig. 2
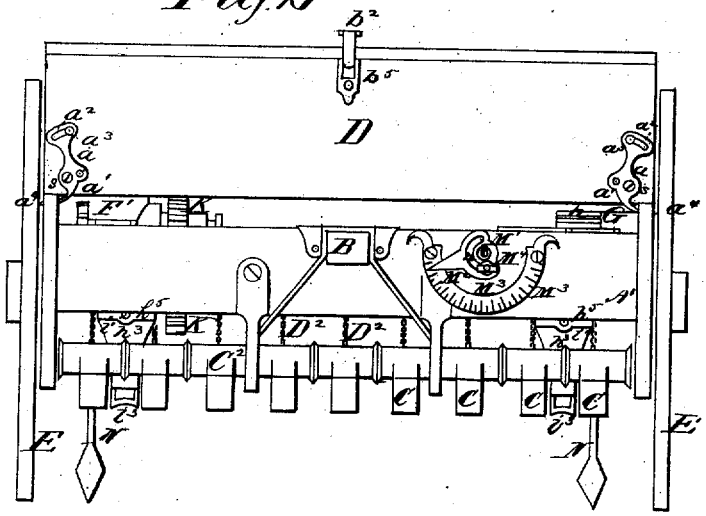
Witnesses.
A. Connolly
Jas. P. Connolly
Inventor.
Willard A. Van Brunt
By Connolly Bros
Attorneys.
N. PETERS, PHOTO-LITHOGRAPHER, WASHINGTON, D. C.

W. A. VAN BRUNT.

SEEDER AND CULTIVATOR.

No. 7,466. Reissued Jan. 16, 1877.

Witnesses

A. Connolly

Jos. B. Connolly

Inventor.

Willard A. Van Brunt

By Connolly Bros

Attorneys

N. PETERS, PHOTO-LITHOGRAPHER, WASHINGTON, D. C.

UNITED STATES PATENT OFFICE.

WILLARD A. VAN BRUNT, OF HORICON, WISCONSIN.

IMPROVEMENT IN SEEDERS AND CULTIVATORS.

Specification forming part of Letters Patent No. 158,152, dated December 22, 1874; reissue No. 7,466, dated January 16, 1877; application filed September 14, 1876.

*To all whom it may concern:*

Be it known that I, WILLARD A. VAN BRUNT, of Horicon, in the county of Dodge and State of Wisconsin, have invented certain new and useful Improvements in Seeders and Cultivators; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 3:
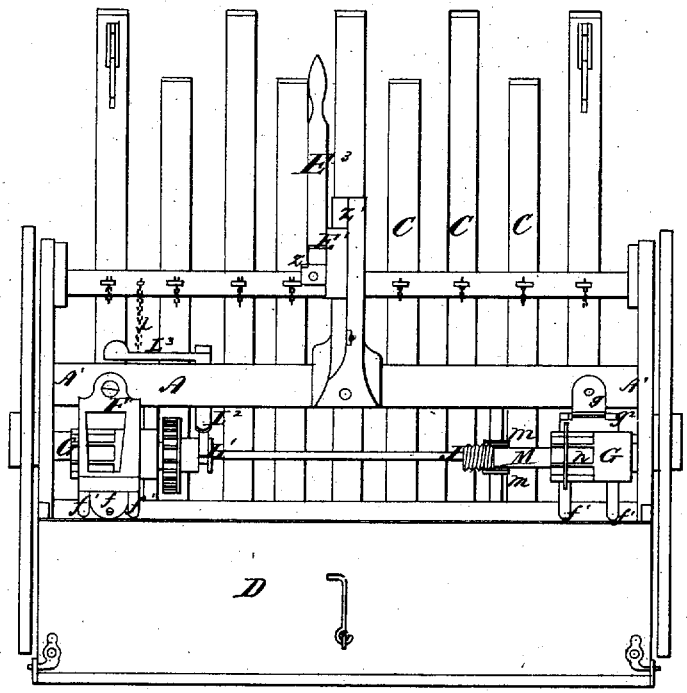
Figure 4:
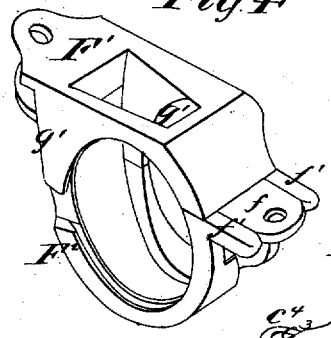
Figure 5:
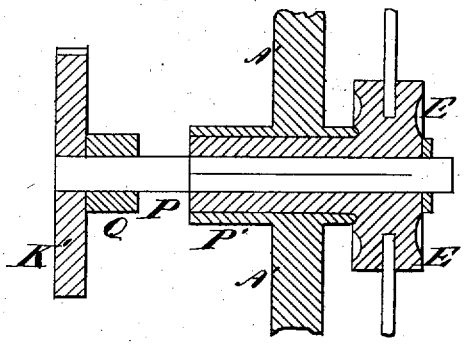
Figure 6:
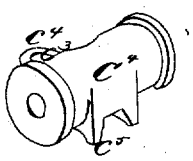

In the drawings, Figure 1 is a vertical longitudinal section of my improved seeder and cultivator. Fig. 2 is a front elevation. Fig. 3 is a plan view, with seed-hopper thrown forward on its hinges, and a portion of one of the seed-boxes removed to show construction and arrangement of parts. Fig. 4 is a perspective view of one of the seeding-boxes. Fig. 5 is a sectional view of the wheel, hub, spindle and bearing. Fig. 6 is a perspective view of one of the collars supporting the drag-bars, and Fig. 7 is a perspective view of a seed-tube and supporting-plate.

The subject of this invention is a combined broadcast-seeder and cultivator. The improvements constituting said invention have reference to, first, the mechanism for throwing the seeding devices in or out of gear with the axle, through which the requisite motion is conveyed from one of the main wheels, said mechanism being so connected to the devices through which the drag-bars are raised and lowered that the gearing and ungearing of the seeding mechanism, and the lowering of the drag-bars, will be effected simultaneously and through the medium of the same main controlling-lever or equivalent device; secondly, to the means for connecting the pivoted adjustable drag-bars to their forward supporting-bar, whereby the requisite rigidity is secured through the use of but a single bolt for each drag-bar, and whereby any drag-bar may be removed without disturbing the position of the others; thirdly, the scattering-tube, through which the seed falls, and from which it is scattered, said tube being held firm at the top by means of a wooden peg, which will allow the tube to yield against obstruction, and thereby avoid injury; fourthly, to the seeding mechanism, comprising the cylinders, their boxes, and the devices for regulating and indicating the exact quantity of seed deposited by each cup; fifthly, the construction and novel arrangement of the short axles, their supporting-boxes, and the wheel hub, the last mentioned being made of cast-metal, and the axle of wrought metal, said hub having its inner end recessed to form a bearing, and its core made square to receive the square head of the axle, and cause the same to turn with the wheel; sixthly, the seed-box or hopper, which is attached to the frame by means of hinges, which are designed to answer a double purpose, viz., to allow the box to be turned over, and to secure said box or hopper snugly to the frame, the hinges for the latter purpose being adjustable, as hereinafter explained; seventhly, the devices through the medium of which the drag-bars are raised, lowered, or adjusted; eighthly, the cultivator-teeth, and connection therewith of toggle-levers, which will retain the teeth in position against the ordinary resistance of the soil, but which will allow the teeth to yield against any extraordinary resistance or obstruction; and, ninthly, the provision of a central support for the eccentric bar, which sustains the drag-bars.

Referring to the accompanying drawings, A designates the frame or bed of an implement embracing the elements of a combined broad-cast seeder and cultivator. B designates the tongue; C, the drag-bars; D, the seed box or hopper, and E the wheels.

The hopper is hinged to the forward portions of the side castings A′ of the frame by means of the peculiarly formed hinges $a$, which are pivoted to the hopper, as shown, by screws or pins $a^1$, and have curved slots $a^2$ in their upper parts, through which pass bolts $a^3$, entering the front of the hopper. These hinges are provided at their lower ends with outwardly-curved arms $a^4$, which work in lugs or projections $a^5$ of the side castings A′. The object of the slots $a^2$ is to allow the hinges to be adjusted so that the hopper may be snugly fitted to its proper position upon the frame. Upon said hinges it is obvious that the hopper may be turned over, to allow of access being had to the seeding-cylinders, or for other purposes.

When adjusted, the hinges are rigidly secured by screws S. When in its ordinary position, the hopper is held down by means of a hook, $b$, attached to an eye on the curved arm or standard, $b^1$. The lid of the hopper is hinged. When shut, said lid is secured by a bent latch, $b^2$, the thumb-plate $b^3$ of which rests on a spring, $b^4$, the force of which causes the barbed end $b^5$ to engage with its catch $b^6$. When the lid is raised, a hinged brace, $c$, connecting with a staple, prevents it from falling back.

The seed passes from the hopper through openings in the floor, to which lead inclined boards or plates. Corresponding to these openings are the cylinder-boxes F, which are secured to the front and rear transverse bars of the frame, and are made each in two sections, upper and lower, $F^1$ and $F^2$. The upper section has a plate, $f$, projecting forward and included between arms $f'$ of the lower section. The plate and arms rest in notches in the front bar of the frame A, the former being secured to said bar by a bolt, as shown. Both sections extend rearwardly beyond the cavity of the box, the recessed portion of which converges toward the escape-opening, for the purposes of a force-feed, and are secured to the rear bar of the frame by a bolt. A washer or collar, $g$, intervenes between the extensions. The upper section has two arms, $g^1$, which depend and embrace the narrowed rear portion of the lower section. The top surface of said narrowed portion is transversely grooved at $g^2$ to receive the beveled wall $g^3$ of the upper section, intervening between the arms $g^1$.

G designates the seed-cylinders, each of which has about one-half its length formed with recesses $h$ for cups, said cups having radial walls flush with the plain surface of the cylinder. The cavity of the box is recessed to leave a space between the edges of the radial wings of the cylinder and the walls of said cavity, so as to prevent the crushing of seed.

The sides of the boxes are open for the reception of the cylinders, which are adjustable lengthwise to regulate the quantity of seed deposited. The side through which the recessed end of the cylinder passes contains a radially-notched ring, $h^1$, which is held in corresponding grooves in the two sections of the box. The seed passes from the forward portion of the boxes through the spouts $h^2$, and thence to the scattering-tubes $h^3$. The tubes $h^3$ have, at the sides of their mouths, lugs $h^4$, by which they are hinged to plates $h^5$, secured to the frame A. Said plates and tubes have in front corresponding loops $i$, through which are inserted the wooden pegs $i^1$, designed to hold said tubes in position, but to yield from the obstruction and prevent injury to the tubes, the latter turning back freely on their hinges when the pegs are broken. At their lower ends the tubes have concavo-convex plates $i^3$, curved forward across their openings, upon which plates the seed falls, and is thereby broadcast.

The seed-cylinders are arranged upon a rotary transverse shaft, J, through which motion is conveyed to them, a toothed wheel, K, being placed on said shaft, and engaging with one, $k'$, on one of the axles. In order that the said wheels may be thrown in and out of gear the wheel K is provided with a grooved collar or hub, which is embraced by a fork, $L^1$, connected, through the medium of a crank, $L^2$, to a weighted bar, $L^3$. The wheel K is arranged to slide upon its shaft, and is thrown in and out of gear according as the weighted bar is lowered or raised. The weight of said bar prevents the wheels from being disengaged accidentally.

The seed-cylinders are capable of longitudinal adjustment to regulate the quantity of seed, which adjustment is obtained through the medium of a rack, M, on the shaft J, with which engages a pinion, $m$, on a shaft, $m^1$. To the forward end of said shaft $m^1$ is attached a plate, $M^1$, having a pointer, $M^2$, by which is indicated, on a graduated segment, $M^3$, the quantity of seed deposited. The shaft $m^1$ is turned through the medium of the pointer and plate. The latter is provided with a segmental slot, $m^4$, through which passes a screw, $m^5$, holding a thumb-nut, $n$, by tightening which the pointer and shaft $m^1$ are held at any desired point of adjustment.

The drag-bars C are supported at their forward ends by a transverse bar, $C^1$, which is sustained by the depending portions of the side plates of the frame A. To said transverse bar the drag-bars are hinged by means of the sockets $C^2$, which are rigidly secured to their respective drag-bars by means of a single screw or bolt, $c^3$, through the rearwardly-projecting plate $c^4$ of each socket or collar, and by means of the projections $c^5$, which are driven into the drag-bars, as shown.

By removing the fastening-bolt $c^3$, any one or more of the drag-bars may be displaced without interfering with the arrangement of the others.

Behind the main frame A the drag-bars are connected to a shaft, $D^1$, by chains $D^2$ passing around it. This shaft is supported upon eccentrics $D^3$, pivoted to the upwardly-curved arms of the side plates.

A flanged socket-plate, $E^1$, is secured to the shaft $D'$, and holds a lever, $E^3$, by which said shaft is swung around the axis of its eccentrics to raise and lower the drag-bars by the wrapping and unwrapping of the chains. To the shaft $D'$ may be also connected the weighted arm $L^3$ by a chain, $l$, so that the gearing and ungearing of the wheels K $K'$ may be effected simultaneously with and to correspond to the raising and lowering of the drag-bars.

To one side of the socket-plate $E^1$ is pivoted a spring-pawl or dog, $E^2$, which engages with the teeth of a segmental rack which has its base secured to the frame A. This rack is a continuation of the bar or standard $b'$. The curvature of the rack is concentric with the axis of motion of the shaft D'. By means of said rack and the pawl $E^2$ the shaft D' may be retained at any desired position to regulate the height of the drag-bars. The teeth of the rack are beveled on one side only, thus allowing the lever to be thrown back and the drag-bars raised without releasing the pawl, which latter operation may, however, be accomplished through the medium of the elbow-lever $E^4$ and connecting-rod $E^5$. The flange $z$ of the socket-plate and the lip $z'$ of the rack-bar are correspondingly curved, and one fits and moves upon the other, as shown.

The precise construction described of the segmental rack and connection is not absolutely essential to the operation of the bar D' and the suspended drag-bars. Various modifications of the rack and pawl, all within the spirit of my improvement, are possible; but it is an important feature of my invention that the eccentric bar is provided with a central support in the rock-bar, to prevent sagging. The drag-bars are slotted near their rear ends to receive the shovel-standards N, pivoted to the bars and rising some distance above. The upper ends are connected each to a pair of toggle or lock levers, O O', of which the latter is pivoted to the drag-bar within a slot or recess, $p$. By means of adjusting pins or screws $p'$ the lock-levers are held in such position that the shovels will withstand the ordinary resistance of the soil, but will yield against stones or other like obstructions, and turn back on their pivots a sufficient distance to pass over the obstructions, after which the shovels may be returned to their normal positions by pressing the lock-levers down.

With reference to the main wheels of the implement, it will be observed that the hub, which is cast, has on its inner side a spindle, P, having a square hole through the center to receive the square end of the axle, and cause the same to turn with the wheel. A nut on the threaded extremity of the axle secures the wheel in place. The spindle P has its bearings in a box, P', formed on the side plate of the main frame. The outer end of said box enters a groove in the inner side of the hub. The axle is supported at its inner end by the box Q.

Having described my invention, I claim as new and desire to secure by Letters Patent—

1. The combination, with the drag-bars C, and an eccentrically-journaled shaft, from which the former are suspended, of the lifting and supporting devices, consisting essentially of a rigid support and a lever attached to said shaft, and provided with means for engagement with and disengagement from said support, substantially as and for the purpose set forth.

2. The combination, with the eccentrically-journaled shaft D supporting the drag-bars C, of the chain $s$, weighted lever $L^3$, gear-wheel K, and intermediate connection between said lever and wheel, whereby the drag-bars and seeding devices may be adjusted simultaneously, as and for the purpose set forth.

3. The combination of the tube $h^3$ and plate $h^5$, said tube being hinged or swung upon said plate, and fastened to it in front by a yielding connection, for the purpose set forth.

4. The cylinder-box, having a converging c annel or cavity in its lower interior surface, in combination with an adjustable cylinder, substantially as described.

5. The combination, with the toggles $o$ $o'$, drag-bars C, and shovel-standards N, of the pins or screws $p'$, substantially as and for the purpose set forth.

6. The collars $C^2$, formed with the projections $C^5$, to enter the drag-bars in front, and the rearwardly-projecting plate $C^4$, to receive a fastening-bolt, substantially as shown and described.

7. The pivoted adjustable hinges, consisting of the plates $a$, having the curved lateral projections $a^4$ and transverse slots $a^2$, in combination with the hopper D and frame A, substantially as shown, and for the purpose specified.

8. The combination, with the side castings A', having the annular flanges or journal-box P', of the wheel E, mounted upon spindle, from which it is detachable without removing the latter, and having an inwardly-projecting bearing fitting the spindle, and having its bearings in said box P, substantially as shown and described.

9. The combination, with the eccentrically-arranged shaft D, for supporting and adjusting the drag-bars, of a support located between the ends of said shaft, to prevent sagging.

In testimony that I claim the foregoing I have hereunto set my hand this 7th day of August, 1876.

WILLARD A. VAN BRUNT.

Witnesses:
CHARLES ALLEN,
JOHN CARROLL.